Nov. 21, 1939.   A. HALLER   2,180,677

DISK BRAKE

Filed June 1, 1936   2 Sheets-Sheet 1

Inventor
A. Haller
by G. F. Elwin
Attorney

Nov. 21, 1939.    A. HALLER    2,180,677
DISK BRAKE
Filed June 1, 1936    2 Sheets-Sheet 2

Inventor
A. Haller
by G. P. Elwin
Attorney

Patented Nov. 21, 1939

2,180,677

UNITED STATES PATENT OFFICE 2,180,677

DISK BRAKE

Arnold Haller, Baden, Switzerland, assignor to Aktiengesellschaft Brown Boveri & Cie., Baden, Switzerland, a joint-stock company of Switzerland Application June 1, 1936, Serial No. 82,712
In Germany June 3, 1935

7 Claims. (Cl. 200—153)

This invention relates in general to improvements in brakes, and more particularly to a brake for retarding the movement of a rotary shaft such as a shaft actuating a switch contact and for stopping such shaft in at least one definite and angular position.

In power actuated electric switches, for example, the movable contact of the switch is connected with the associated actuating means through a mechanism having an appreciable amount of inertia, and the kinetic energy of such mechanism must be dissipated when the switch contact reaches the one or the other end position thereof. Such energy may be absorbed by suitable springs arranged to retard the movement of the contact toward the end of the movement thereof, but such springs are frequently objectionable in that they cause the actuating mechanism to rebound at the end of the stroke thereof. It is generally preferable to utilize a brake of the frictional type effective to retard the operating mechanism toward the end of the stroke thereof and to positively stop such mechanism in the end position thereof.

It is, therefore, one of the objects of the present invention to provide a brake of the frictional type for retarding a rotary shaft towards the end of the rotation thereof.

Another object of the present invention is to provide an electric switch mechanism including a brake of the frictional type for retarding the mechanism towards the end of the stroke thereof.

Another object of the present invention is to provide a brake of the frictional type for establishing definite end positions for a rotary shaft.

Another object of the present invention is to provide an electric switch mechanism including a brake of the frictional type for establishing definite end positions for such mechanism.

Another object of the present invention is to provide an electric switch mechanism including a unitary brake of the frictional type effective upon both contact closing and contact opening operation of such mechanism.

Objects and advantages other than those above set forth will be apparent from the following description when read in connection with the accompanying drawings, in which.

Figure 1:
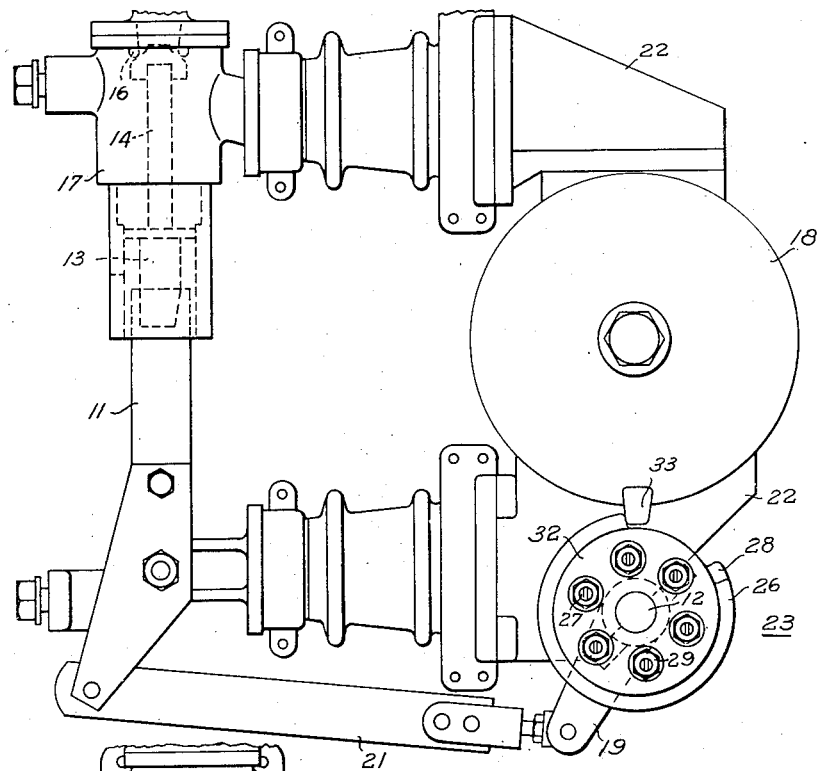
Fig. 1 is a partial side elevational view of an electric switch having an operating mechanism including a driving shaft provided with a frictional brake illustrating the present invention.
Figure 2:
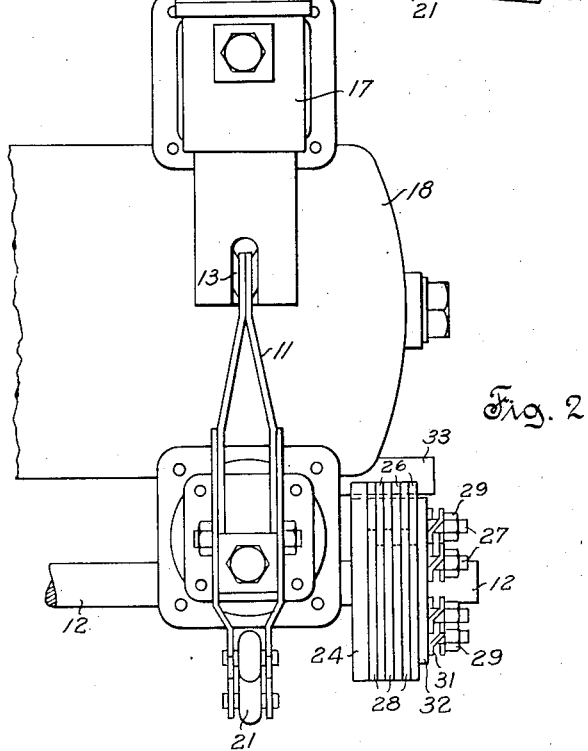
Fig. 2 is a partial front elevational view of one pole of the switch illustrated in Fig. 1 with the brake applied thereto.
Figure 3:
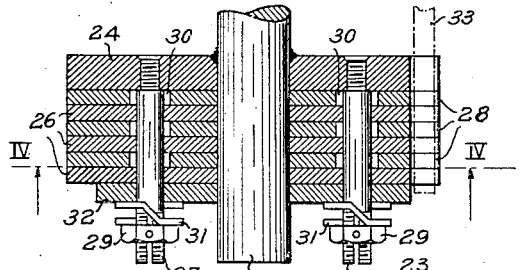
Fig. 3 is an enlarged axial cross-section through the brake illustrated in Fig. 1 shown in a position corresponding to the open position of the switch and taken along a plane defined by line III—III in Fig. 4.
Figure 4:
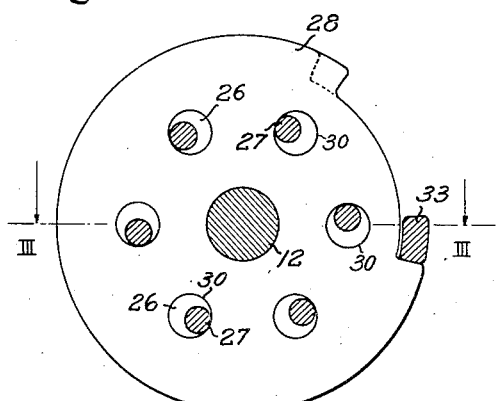
Fig. 4 is a transverse cross-section through the brake taken along a plane defined by line IV—IV in Fig. 3.

Elements having the same function are designated in all figures of the drawings by the same reference character, although such elements may be shaped and arranged differently in the different embodiments shown. It will be understood that elements shown in different figures of the drawings may also be combined to form further embodiments of the present invention.

Referring more particularly to the drawings by characters of reference, reference numeral 11 designates a movable switch contact to be actuated by means of a power driven rotary shaft 12. Contact 11 is herein illustrated as being a disconnecting switch blade forming part of a structure of the type disclosed and claimed in copending application Serial No. 60,362 of A. Haller and H. Thommen, filed January 23, 1936, now Patent No. 2,144,372, patented January 17, 1939. Contact 11 cooperates with a fixed contact 13 of the spring jaw type to form a disconnecting switch in series with another switch comprising a movable arcing contact 14 and a fixed arcing contact 16 arranged within an arcing chamber 17. Contact 14 is arranged to be actuated by fluid under pressure obtained from a reservoir 18, the fluid also serving to blow out the arc established between the arcing contacts. Shaft 12 is arranged to actuate contact 11, and other similar contacts if the switch is of the multipole type, between a closed position and an open position, the mechanical connection between the shaft and each contact being effected through a crank 19 and an insulating connecting rod 21. The shaft is supported for rotary movement in both directions of rotation within a predetermined range of angular positions in a suitable frame which, in the embodiment herein illustrated, consists of reservoir 18 and of a plurality of brackets 22 fastened thereto, some of the brackets being provided with bearings for the shaft. The reservoir is supported on its foundation in any suitable manner and constitutes the supply of operating fluid for a fluid motor (not shown) operable to move shaft 12 in both directions of rotation within a predetermined range of angular positions to thereby move contact 11 into the open and closed positions thereof.

Contact 11 and the operating mechanism thereof comprising the fluid motor, shaft 12, crank 19 and connecting rod 21 have a material inertia, and the movement thereof, which is always effected at high speed, is retarded at the end of each stroke of the motor by dissipating the kinetic energy of such mechanism in a brake 23 of the frictional type which also serves to positively stop the shaft in either one of two definite angular end positions. The brake is thus operable in each direction of rotation of shaft 12 to limit the movement of the shaft and comprises elements relatively movable in frictional engagement and cooperating with a member for causing relative movement of such elements upon movement of the shaft through a predetermined angular position, for braking the shaft and for stopping the shaft upon movement thereof into another angular position. Such elements consist preferably of a pair of interleaved groups of disks.

In the embodiment illustrated in Figs. 1 to 5, one of such groups of disks comprises a relatively heavy disk 24 welded to shaft 12 or otherwise fastened thereto, and a plurality of lighter disks 26 slipped over shaft 12 and maintained in substantially invariable angular relation with disk 24 and with the shaft by means of studs 27 screwed into disk 24 and penetrating through disks 26 with a snug fit. The disks 28 constituting the other group of disks are interleaved with disk 24 and disks 26, and are loosely mounted on shaft 12. Disks 28 each present apertures 30 through which studs 27 penetrate, such apertures 30 being of any suitable shape having dimensions, on a circle concentric with shaft 12, greater than the diameter of studs 27 so as to permit limited relative rotational movement of the two groups of disks. During such movement, the disks are adjustably urged into frictional engagement by means of nuts 29 screwed on studs 27, which nuts exert a pressure on the disks through spring washers 31 and through a pressure plate 32. The pressure exerted on the disks may be varied by turning nuts 29, which are maintained in the desired position by means of cotter pins passing through slots in the studs. Spring washers 31 may be omitted if the disks of one group are dished so as to be resiliently deformed upon tightening of nuts 29.

The two groups of disks are made of materials which may slide on each other without scoring, such as steel and brass, and a supply of suitable lubricant may be enclosed within the apertures of disks 28, if desired. All the disks have the edges thereof provided with cam shaped projections, or are provided with one or more notches to permit limited rotary movement of the disks with respect to one or more lugs or dogs 33 fixedly mounted on the switch frame. In Fig. 1, only one dog is illustrated, and such dog is shown in contact with the edge of the notches of all the disks which was the trailing edge during closure of the switch. It will be noted that the notches of disks 28 are shorter than those of disks 24 and 26 by not more than the maximum relative circumferential movement of the two groups of disks permitted by the play of studs 27 in the apertures 30 of disks 28.

The operation of the switch to open the associated circuit comprises opening movement of contact 14, after which movement contact 11 is to be moved into the open position. The actuating mechanism of contact 11 is accordingly caused to impart to shaft 12 a sudden rotary motion, which is seen as being in the counterclockwise direction in Fig. 1. Shaft 12 also causes disk 24 and disks 26 to rotate, and the pressure between such disks and disk 28 is sufficient to cause all disks to move jointly without relative displacement therebetween. The edge of the disk notches which was in contact with dog 33 becomes the leading edge and moves out of engagement with dog 33. When the movement of shaft 12 is nearly completed and the shaft moves through a predetermined angular position, dog 33 engages the trailing edge of the slots of disks 28, thus causing disks 28 to stop. Disk 24 and disks 26, however, continue to rotate with shaft 12, and the relative movement of the groups of disks in frictional engagement dissipates an adjustable amount of the kinetic energy of the actuating mechanism and brakes the shaft to decelerate the movement thereof.

Upon further movement of the shaft into another angular position which is the end position thereof corresponding to the open position of contact 11, dog 33 engages the trailing edge of the notch of disk 24 and disks 26 and thus brings shaft 12 to a full stop in such position. Such end position is reached by the shaft at a relatively low speed, which is adjustable by variably tightening nuts 29 and such speed may be so adjusted that the shaft will always reach the end position without thereafter rebounding to an appreciable extent. The shaft and the disks then reach the position illustrated in Figs. 3 and 4 relative to the position of dog 33. The supply of operating fluid to the switch motor may then be interrupted, the switch remaining in the position reached thereby under the action of gravity, or such supply may be maintained as may be found most advantageous.

To return contact 11 into the closed position shown in Fig. 1, shaft 12 is rotated in a clockwise direction, dog 33 upon initiation of such return movement disengages all the disks, and thereafter reengages disks 28 upon movement of shaft 12 through a predetermined angular position to brake the shaft, and reengages disk 24 and disks 26 upon further return movement of the shaft into the angular position shown in Fig. 1 to stop the shaft. The relative position of the disks and of dog 33 is then again that shown in Fig. 1, such relative position being more clearly illustrated in Fig. 5.

Figure 6:
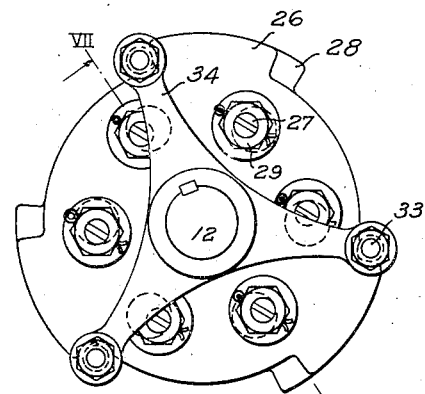
Fig. 6 is a view in axial projection of a modified embodiment of the invention showing the brake disks mounted on the switch frame instead of being mounted on the shaft.
Figure 5:
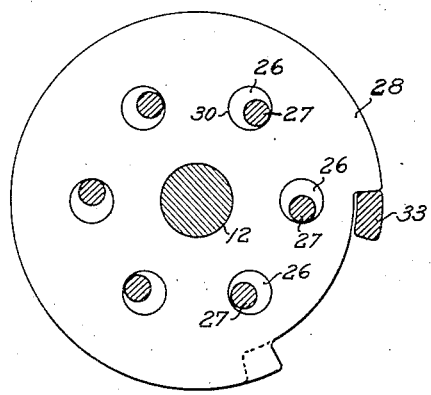
Fig. 5 is a view similar to Fig. 4 but showing the position of the brake elements when the switch is in the closed position as shown in Fig. 1.
Figure 7:
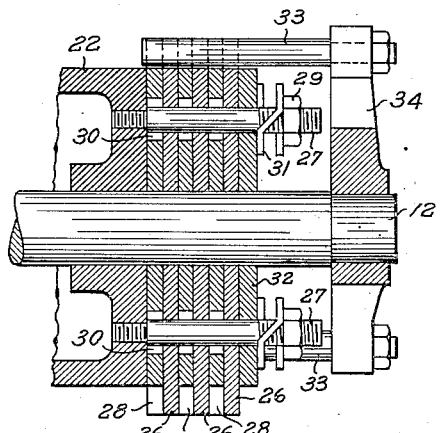
Fig. 7 is an axial cross-sectional view taken along a plane defined by line VII—VII in Fig. 6.

From a kinematic point of view, the switch frame and shaft 12 constitute members subject to limited relative rotary movement, and the elements or disks which form portions of the means for limiting such movement and are relatively movable in frictional engagement, may be supported by either one of such members, the cooperating element or dog being fixedly mounted on the other one of such members. In the embodiment illustrated in Figs. 6 and 7, which is shown in the position corresponding to the closed position of contact 11, disk 24 is omitted and studs 27 are screwed into bracket 22, whereby parallel disks 26 are fixedly mounted on the switch frame to render such disks stationary, and disks 28 interleaved therewith may have a limited angular displacement with respect to disks 26 as in the embodiment illustrated in Fig. 1. The disks are each shown as provided with three notches cooperating with three dogs 33 mounted on a spider 34 keyed to shaft 12. The operation of the present embodiment in decelerating shaft 12 and in stopping such shaft in either end position thereof is similar to that of the previously described embodiment and will be apparent without further explanation.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. An electric switch comprising a frame, a movable contact member, a rotary shaft supported by said frame for actuating said contact member, and means for limiting the movement of said shaft and comprising a pair of interleaved groups of disks relatively movable in frictional engagement, and a dog engaging one of said groups of disks upon movement of said shaft through a predetermined angular position for braking said shaft by the friction between said groups of disks and engaging the other of said groups of disks upon further movement of said shaft into another predetermined angular position to stop said shaft.

2. An electric switch comprising a frame, a movable contact member, a rotary shaft supported by said frame for actuating said contact member, and means for limiting the movement of said shaft and comprising a first group of disks mounted on said shaft in fixed angular relation therewith, a second group of disks loosely mounted on said shaft and interleaved with the first said disks, means for urging said groups of disks into mutual frictional engagement, a dog fixedly mounted on said frame engaging the second said group of disks upon movement of said shaft through a predetermined angular position to brake the movement of said shaft and engaging the first said group of disks upon further movement of said shaft into another predetermined angular position to stop said shaft.

3. An electric switch comprising a frame, a movable contact member, a rotary shaft supported by said frame for actuating said contact member, and means for limiting the movement of said shaft and comprising a first group of disks fixedly mounted on said frame, a second group of disks interleaved with the first said disks and rotatably movable with respect thereto, means for urging said groups of disks into mutual frictional engagement, a dog mounted on said shaft for engaging the second said group of disks upon movement of said shaft through a predetermined angular position to brake the movement of said shaft and engaging the first said group of disks upon further movement of said shaft into another predetermined angular position to stop said shaft.

4. An electric switch comprising a frame, a movable contact member, a rotary shaft supported by said frame for actuating said contact member, and means for limiting the movement of said shaft in both directions of rotation within a predetermined range of angular positions, said means comprising a pair of interleaved groups of disks relatively movable in frictional engagement, and a dog engaging one of said groups of disks upon movement of said shaft through a predetermined angular position for braking said shaft by the friction between said groups of disks, and engaging the other of said groups of disks upon further movement of said shaft into another predetermined angular position to stop said shaft, said dog disengaging said disks upon initiation of return movement of said shaft, reengaging said one of said groups of disks upon movement of said shaft through a third predetermined angular position to brake said shaft and reengaging the said other of said groups of disks upon further return movement of said shaft into a fourth predetermined angular position to stop said shaft.

5. A brake for a rotary shaft supported by a frame and operable within a limited range of angular positions and comprising a first group of disks mounted on said shaft in fixed angular relation therewith, a second group of disks loosely mounted on said shaft and interleaved with the first said disks, means for urging said groups of disks into mutual frictional engagement, a dog fixedly mounted on said frame to engage the second said group of disks upon movement of said shaft through a predetermined angular position to brake the movement of said shaft and engaging the first said group of disks upon further movement of said shaft into another predetermined angular position to stop said shaft.

6. A brake for a rotary shaft operable within a limited range of angular positions and comprising a first group of parallel stationary disks, a second group of disks interleaved with the first said disks and rotatably movable with respect thereto, means for urging said groups of disks into mutual frictional engagement, a dog mounted on said shaft for engaging the second said group of disks upon movement of said shaft through a predetermined angular position to brake the movement of said shaft and engaging the first said group of disks upon further movement of said shaft into another predetermined angular position to stop said shaft.

7. A brake for a rotary shaft supported by a frame and operable within a limited range of angular positions comprising a disk mounted on said shaft in fixed angular relation therewith, a second disk loosely mounted on said shaft, means for urging said disks into mutual frictional engagement, a member fixedly supported on said frame to engage the second said disk upon movement of said shaft through a predetermined angular position to brake the movement of said shaft and engaging the first said disk upon further movement of said shaft into another predetermined angular position to stop said shaft.

ARNOLD HALLER.